J. R. WALTON.
CULTIVATOR.
APPLICATION FILED APR. 18, 1921.
1,418,342.
Patented June 6, 1922.
2 SHEETS—SHEET 1.
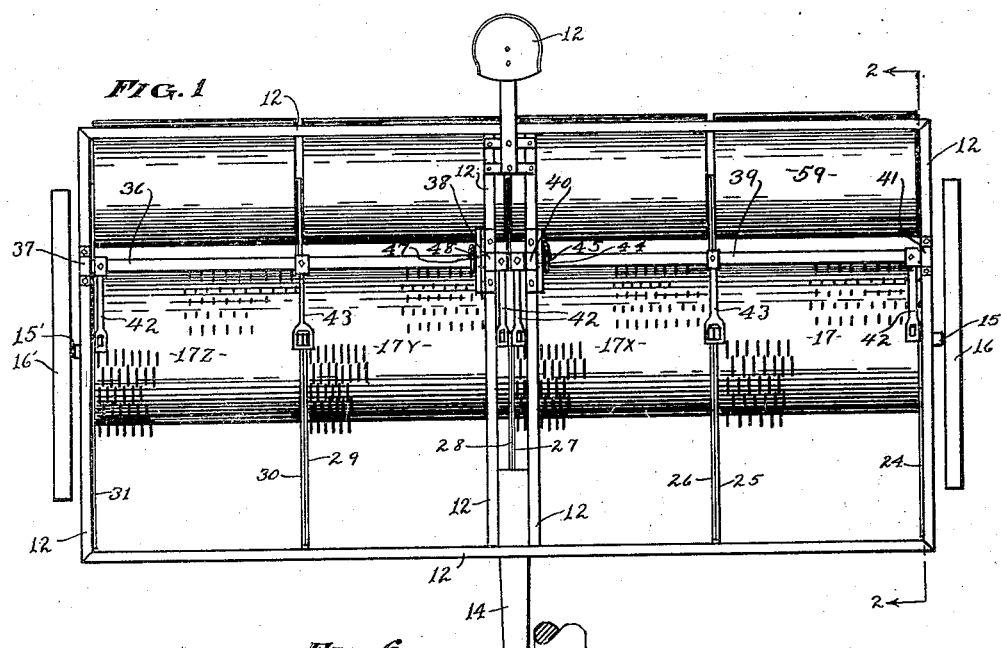
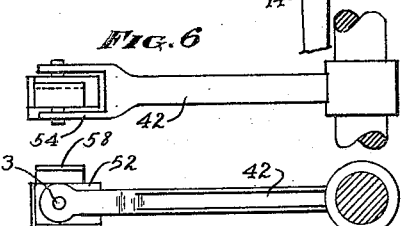
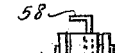
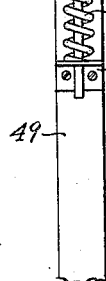
INVENTOR.
John R. Walton
BY
U. G. Charles  ATTORNEY.

J. R. WALTON.
CULTIVATOR.
APPLICATION FILED APR. 18, 1921.
1,418,342.
Patented June 6, 1922.
2 SHEETS—SHEET 2.
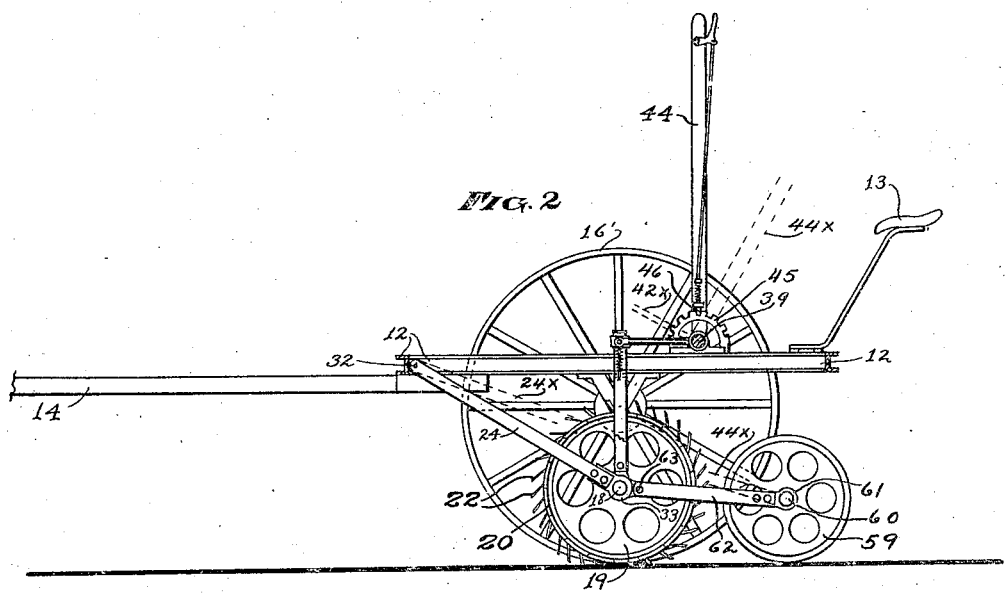
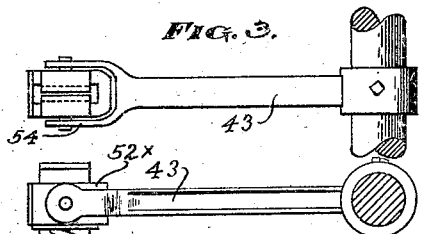
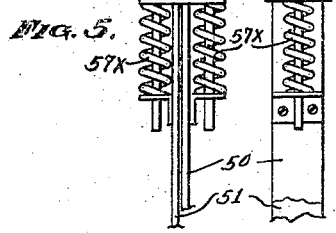
INVENTOR.
John R. Walton
BY
U.G. Charles    ATTORNEY.

UNITED STATES PATENT OFFICE.

JOHN R. WALTON, OF WICHITA, KANSAS.

CULTIVATOR.

1,418,342.   Specification of Letters Patent.   Patented June 6, 1922.

Application filed April 18, 1921. Serial No. 462,143.

*To all whom it may concern:*

Be it known that I, JOHN R. WALTON, a citizen of the United States, residing at Wichita, in the county of Sedgwick and State of Kansas, have invented certain new and useful Improvements in a Cultivator, of which the following is a description, referring to the drawings which accompany this specification.

The invention relates to an improved type of cultivator for agricultural purposes and embodies novel and specific improvements such as will be more fully discussed and described by reference to the accompanying drawings, in which; Fig. 1 is a plan view of the machine; Fig. 2 is a side view of the machine as represented by a sectional view taken along the line 2—2, Fig. 1 and looking in the direction of the arrows; Fig. 3 is a plan view of the supporting arms as shown at Fig. 1 supporting two drums; Fig. 4 is a side view of the device seen in Fig. 3; Fig. 5 is a front view of Fig. 4; Fig. 6 is a plan view of a supporting arm as employed in Fig. 1 to carry a single drum; Fig. 7 is a side view of Fig. 6 and Fig. 8 is a front view of Fig. 7. Similar numerals of reference indicate corresponding parts throughout all the figures of the drawings.

Referring to the drawings; 12 is the frame of the cultivator, 13 is the driver's seat supported therefrom, 14 represents the tongue. The frame 12 is carried by axles 15, 15' and wheels 16, 16'. Four cultivator drums, 17, $17^x$, $17^y$, $17^z$ are arranged end to end as seen in Fig. 1 each provided with an axle such as the shaft 18. A drum comprises drum heads such as 19 with a series of plates 20 attached to the rims of the spaced apart heads 19. Teeth 22 are bolted to each of the plates 20, preferably in two rows, staggered. Each tooth 22 projects from the plate 20 and is set at an angle, less than 90° as seen in Fig. 2.

Strap iron hangers 24, 25, 26, 27, 28, 29, 30, 31 are pivotally supported as at 32 from the front of the frame 12 and extend rearwardly and downwardly at an acute angle to the frame 12; each hanger terminates at its lower end in a bearing such as 33 in which the adjacent end of the axle 18 is mounted. The spiked drums therefore are each pivotally supported from the pivotal points such as 32 and during the forward progress of the cultivator, roll on the ground so that the teeth enter the ground, Fig. 2, in nearly a vertical position. As the drum rolls towards the right, the tooth 22 changes its entering angle, respective to the ground line as shown in Fig. 2 to a lesser angle and as the drum rolls still further, each tooth in its turn more nearly approaches to a position parallel with the surface of the ground and in its forward rolling motion, the tooth is carried up and breaks up the ground as it leaves the earth.

Adjustment of the drums is made as follows. A shaft 36 is mounted in the boxings 37 and 38 carried by the frame 12, the shaft 36 being arranged in parallelism to the axis of the drums. A second shaft 39, similar to 36 is likewise mounted in the boxings 40, 41. At the ends of the shafts 36 and 39 are rigidly secured arms such as 42, Figs. 6 and 7, while intermediate the ends of said shafts are rigidly positioned arms such as 43, Figs. 3 and 4. A lever 44 is rigidly attached to the shaft 39 and is provided with a notched segment 45 on the frame 12 for engaging a dog 46 of the lever 44 as seen in Fig. 2 and by means of which a desired fixed position of the shaft 39 and arms 42, 43 may be had. A similar lever 47 and segment 48 operate in conjunction with the shaft 36 for a like purpose.

Upright strap irons 49, 50, 51 pivotally engage at their base to their respective bearings such as 33. The upper end of the iron 49 connects to the arm 42, while the upper ends of the irons 50, 51 connect to the arm 43. The connections are similar; the strap irons are slidably housed through a block such as 52 or $52^x$. The block 52 is pivotally mounted at 53 to the forked end 54 of the lever 42. Rigid with the block 52 is a pin 55, downwardly extending through an angle 56 rigid with the strap iron 49. A spring 57 is arranged on the pin 55 intermediate the block 52 and the angle support 56. The strap irons are flanged at the top as at 58 to form a head.

To release the drums from contact with the ground, as when leaving or going to the field, the levers are drawn backwardly—for instance, moving and securing the lever 44 in the dotted position $44^x$, Fig. 2—the arms 42 and 43 will assume the dotted position $42^x$, the blocks 52 contacting the heads 58 will raise the irons 49, 50, 51 to raise the bearings 33 and drums 17 from the ground. This movement will pivot the arms 24 series to the dotted position $24^x$.

In case the ground is caked and hardened to such an extent that the teeth 22 fail to penetrate the ground, the levers 44, 47 may be moved to a forward position and held by segment and dog control, thereby tilting the arms 42 and 43 downwardly to throw a pressure through the springs such as 57, 57ˣ into the strap irons 49, 50, 51 to exert a spring pressure against the strap irons onto the drums to force the teeth 22 into the ground.

Trailing behind each drum is seen a roller such as 59. Each roller has an axle 60 mounted in bearings 61. Each bearing 61 being rigid with a strap iron member 62 and forwardly connected to a bearing 33 by a pivotal connecting such as 63. These rollers pack the ground in a pulverized condition the tendency of which is to hold moisture as well as to cultivate the plant. The plates 20 can be unscrewed and defective teeth 22 replaced when necessary.

Such modifications may be employed as lie within the scope of the appended claims.

Having fully described my invention what I now claim as new and desire to secure by Letters Patent is:

1. In a cultivator, a framework on wheels, a plurality of drums arranged end to end transversely to and beneath said frame intermediate the wheel supports thereof; each drum having teeth outwardly projecting from its walls; arms pivotally supported from the front of said frame work and extending rearwardly and downwardly at an acute angle and connecting to axle bearings on each drum and other arms connecting to said bearings and upwardly extending therefrom and terminating in a head portion, each arm of the latter series being slidably housed through a block, said block having a pivoted connection with another arm, a shaft rigid with said arm, a lever rigid with said shaft and a segment on said frame engageable as desired by a dog carried by said lever and whereby the said drums may be pivotally supported from said frame in desired positions.

2. In a cultivator, a framework on wheels, a plurality of drums arranged end to end and transversely to and beneath said frame intermediate the wheel supports thereof; each drum having teeth outwardly projecting from its walls; a plurality of rollers, one for each drum and in the rear of which said roller is pivotally arranged; arms pivotally supported from forward portions of said frame work and extending rearwardly and downwardly at an acute angle and connecting to axle bearings on each drum and other arms connecting to said bearings and upwardly extending therefrom, each of said arms having an upper head element, a block for each arm and sleeved thereon below the head element, a pin depending from said block, a spring positioned by said pin and arranged intermediate a support on said arm and the block, said block having a pivoted connection with another arm, a shaft rigid with this other arm, a lever rigid with the shaft and a segment on said frame engageable as desired by a dog carried by said lever and whereby the said drums may be pivotally supported from said frame in desired positions.

JOHN R. WALTON.

Witnesses:
M. Y. CHARLES,
H. V. ADAMS.